United States Patent [19]
Lee et al.

[11] Patent Number: 5,812,522
[45] Date of Patent: Sep. 22, 1998

[54] LOCATION-RULED RADIO-INTEGRATED NETWORK

[75] Inventors: William Chien-Yeh Lee; F. Craig Farrill, both of Danville, Calif.

[73] Assignee: AirTouch Communications, Inc., San Francisco, Calif.

[21] Appl. No.: 414,377

[22] Filed: Mar. 31, 1995

[51] Int. Cl.⁶ .................................................. H04L 27/30
[52] U.S. Cl. ..................... 370/206; 370/280; 370/281; 370/337; 370/344; 370/347; 370/335; 370/342; 375/202; 375/208; 342/457; 455/456
[58] Field of Search .................................. 370/18, 19, 20, 370/24, 29, 30, 50, 69.1, 95.1, 95.3, 328–330, 335–337, 342–345, 347–348, 280, 281; 375/202, 203, 208, 209, 219, 260, 261, 295, 268, 269, 298, 316, 320; 379/58–62; 455/54.1–54.2, 56.1, 456, 422, 426, 450, 517, 524; 340/988, 991, 993; 342/450, 457

[56] References Cited

U.S. PATENT DOCUMENTS

| | | | |
|---|---|---|---|
| 4,651,156 | 3/1987 | Martinez | 342/457 |
| 4,675,863 | 6/1987 | Paneth et al. | 370/334 |
| 4,876,740 | 10/1989 | Levine et al. | 379/59 |
| 5,099,495 | 3/1992 | Mikoshiba et al. | 375/202 |
| 5,103,459 | 4/1992 | Gilhousen et al. | 370/209 |
| 5,166,694 | 11/1992 | Russel et al. | 342/457 |
| 5,208,756 | 5/1993 | Song | 342/457 |
| 5,218,618 | 6/1993 | Sagey | 342/457 |
| 5,235,633 | 8/1993 | Dennison et al. | 379/60 |
| 5,291,475 | 3/1994 | Bruckert | 375/203 |
| 5,309,474 | 5/1994 | Gihousen | 370/209 |
| 5,339,330 | 8/1994 | Mallinockrodt | 375/205 |
| 5,365,544 | 11/1994 | Schilling | 342/457 |
| 5,455,823 | 10/1995 | Noreen et al. | 370/312 |
| 5,459,759 | 10/1995 | Schilling | 375/202 |
| 5,459,760 | 10/1995 | Watanabe | 375/202 |
| 5,463,671 | 10/1995 | Marsh et al. | 379/56.1 |
| 5,475,677 | 12/1995 | Arnold et al. | 370/280 |
| 5,506,864 | 4/1996 | Schilling | 342/457 |
| 5,526,348 | 6/1996 | Ichiyoshi | 455/56.1 |
| 5,541,954 | 7/1996 | Emi | 375/202 |
| 5,548,582 | 8/1996 | Brajal et al. | 370/202 |
| 5,566,164 | 10/1996 | Ohlson | 375/208 |
| 5,581,548 | 12/1996 | Ugland et al. | 370/330 |
| 5,596,570 | 1/1997 | Soliman | 370/335 |

*Primary Examiner*—Douglas W. Olms
*Assistant Examiner*—Seema S. Rao
*Attorney, Agent, or Firm*—Merchant, Gould, Smith, Edell, Welter & Schmidt

[57] ABSTRACT

An integrated radio frequency communication system, known as a Location-Ruled Radio-Integrated Network (LORRAINE) system, provides integrated voice, data and location services. The radio frequency communications system combines time division multiplexing (TDM) techniques with optional time division duplexing (TDD) or frequency division duplexing (FDD) techniques to provide a plurality of time slot channels for these services. Spread spectrum techniques help reduce noise and interference in the system.

16 Claims, 6 Drawing Sheets

LOCATION-RULED RADIO-INTEGRATED NETWORK

BACKGROUND OF THE INVENTION

1 Field of the Invention

This invention relates in general to mobile communications systems, and more particularly, to an integrated radio frequency communication system that provides voice, data and location services.

2. Description of the Related Art

Vehicle tracking or monitoring systems are well known in the art. Such systems use time of arrival (TOA) calculations for transmissions received from vehicles to determine the location of the vehicles within the service area. The position of vehicles can be determined and graphically displayed on computer monitors in a matter of seconds. As a result, fleet vehicle operators can continuously track the position of their vehicles on digitized road maps. In addition, individual car owners have an effective system for recovering their vehicle in the event of a theft. Examples of such system include the AirTouch Teletrac and Hughes vehicle location systems.

In the AirTouch Teletrac system, a control center initiates a vehicle location request by simulcast paging of the mobile location unit (MLU). The paging message comprises the unique identifier of the particular MLU. The MLU responds to the simulcast paging with a desired response at a particular time period after the page. Each of the receiving sites pick-up the MLU transmission, identify the TOA of the received MLU transmission, and forward this information to the control center. The control center resolves the TOA information from all of the receiving sites into a location within the service area for the MLU. However, the AirTouch Teletrac system does not integrate voice and messaging services with this vehicle location service.

The Hughes vehicle location system is described in U.S. Pat. No. 5,218,618, issued Jun. 8, 1993, to Sagey, and entitled "CELLULAR TELEPHONE SERVICE USING SPREAD SPECTRUM TRANSMISSION". This system employs wide bandwidth spread spectrum radio transmissions overlaid on the spectrum for existing cellular telephone systems to simultaneously provide additional location and messaging services without causing objectionable interference to current users of the cellular telephone systems. The digital signalling required for such services is supported in the same spectral space as the cellular telephone service. However, the Hughes system does not integrate location, voice and messaging services.

Vehicle location systems are not conducive to carrying two-way voice conversations, providing location services and communicating data messages. Nonetheless, there is public interest in providing an integrated system that provides vehicle location, voice, and data messaging services.

SUMMARY OF THE INVENTION

To overcome limitations in the prior art described above, and overcome other limitations that will become apparent upon reading and understanding the present specification, the present invention discloses an integrated radio frequency communication system provides integrated voice, data and location services. The radio frequency communications system combines time division multiplexing (TDM) techniques with optional time division duplexing (TDD) or frequency division duplexing (FDD) techniques to provide a plurality of time slot channels for these services. Spread spectrum techniques help reduce noise and interference in the system.

Accordingly, it is an objective of the present invention to employ technology that overlays voice transmissions and data messaging systems with vehicle location services using spread spectrum and multiplexing technology without adversely affecting the functionality of the vehicle location services.

BRIEF DESCRIPTION OF THE DRAWINGS

Referring now to the drawings in which like reference number represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

Figure 1:
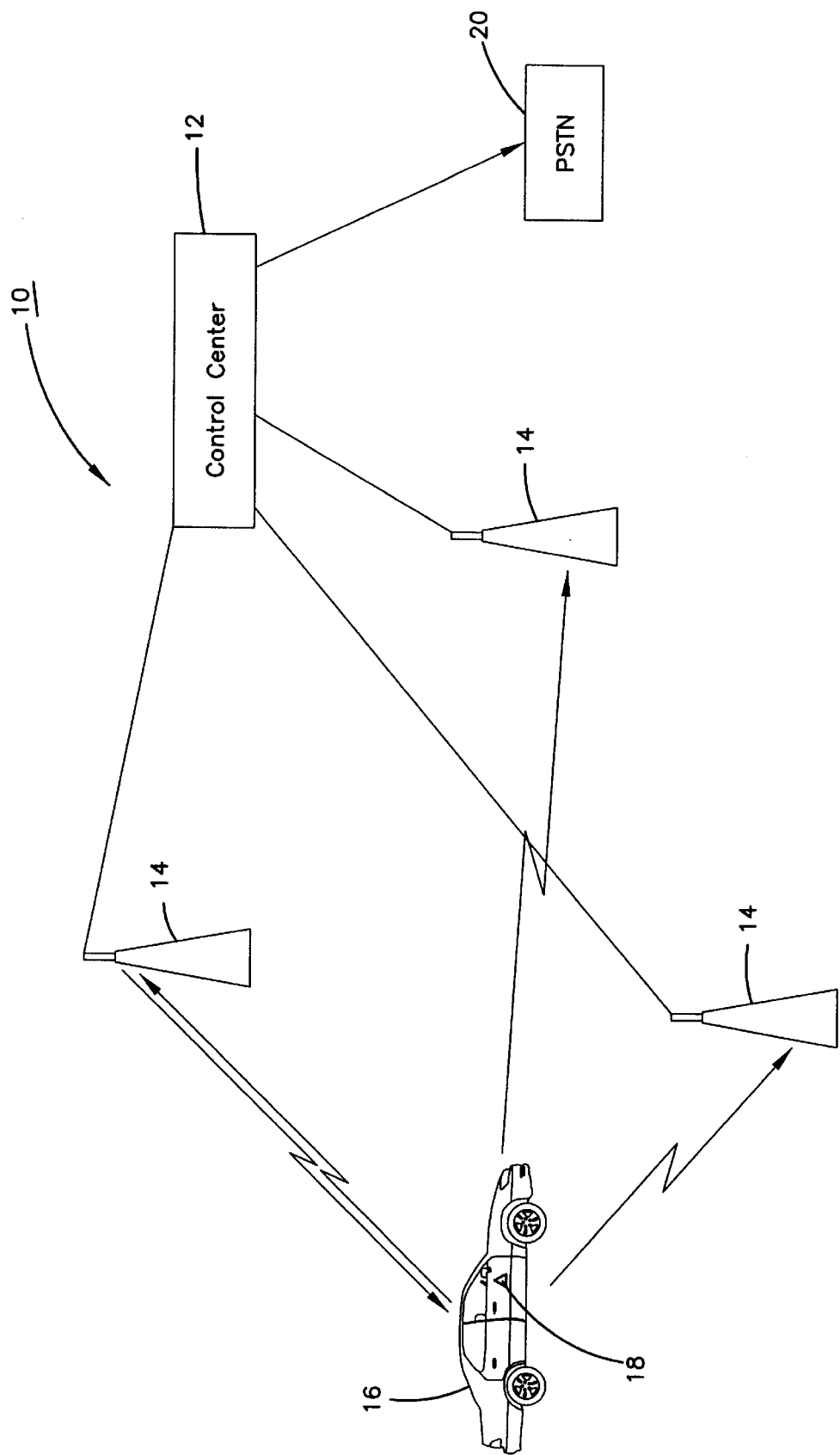
FIG. 1 illustrates a radio frequency communications system implemented using the principles of the present invention and also illustrates the operation of the voice transmission, data messaging and vehicle locating services provided by the present invention.

FIG. 1 illustrates a radio frequency (RF) communications system 10 implemented using the principles of the present invention and also illustrates the operation of the voice transmission, data messaging and vehicle (or other mobile unit) locating services provided by the present invention. The present invention is termed a Location-Ruled Radio-Integrated Network (LORRAINE) system. The LORRAINE system is an RF communication system designated to operate in the 8 MHz spectrum from 904–912 MHz allocated under the rules of 47 C.F.R. Part 90, although other frequency bands could be used as well. Indeed, the present invention provides location, voice, data, facsimile and other services on an integrated basis to more efficiently utilize the designated 8 MHz spectrum or any allocated spectrum on any operating frequencies from 600 MHz to 2.4 GHz.

The RF communications system 10 generally comprises a control center 12, base transceiver sites 14, and vehicles or mobile units 16 containing mobile location units (MLUs) 18 therein. The control center 12 is coupled to a public switched telephone network (PTSN) 20. The conventional aspects of transmitting voice communications, data messages, and vehicle locations requests through the PTSN 20 are well known.

The base sites 14 are shown transmitting and receiving voice, data, and vehicle location requests to the vehicles 16, while the vehicles 16 are shown receiving and transmitting voice, data, and vehicle location responses to the base sites 14. To provide integrated voice, data, and location services, the RF communications system 10 combines time division multiplexing (TDM) techniques with either time division duplexing (TDD) or frequency division duplexing (FDD) techniques to provide a plurality of time slot channels for two-way communications. The use of TDD or FDD techniques depends on whether the allocated spectrum is for single-band channels (simplex) or pair-band channels (duplex). In addition, spread spectrum techniques help reduce noise and interference in the system, and increase the LORRAINE system's capacity for voice and data communication.

In addition to voice and data communication, the LORRAINE system uses multilateration techniques to determine the location of mobile units. Thus, the LORRAINE system enables mobile units to determine and/or display their present location within the coverage area of the LORRAINE system. Alternatively, a computer display terminal coupled to the LORRAINE system can display the location of one or more mobile units. Custom applications of such mobile unit location monitoring can include such things as mobile dispatch, asset management and tracking, recording of lost or stolen property or goods, and user location for emergency purposes.

BASE TRANSMITTER

Figure 2:
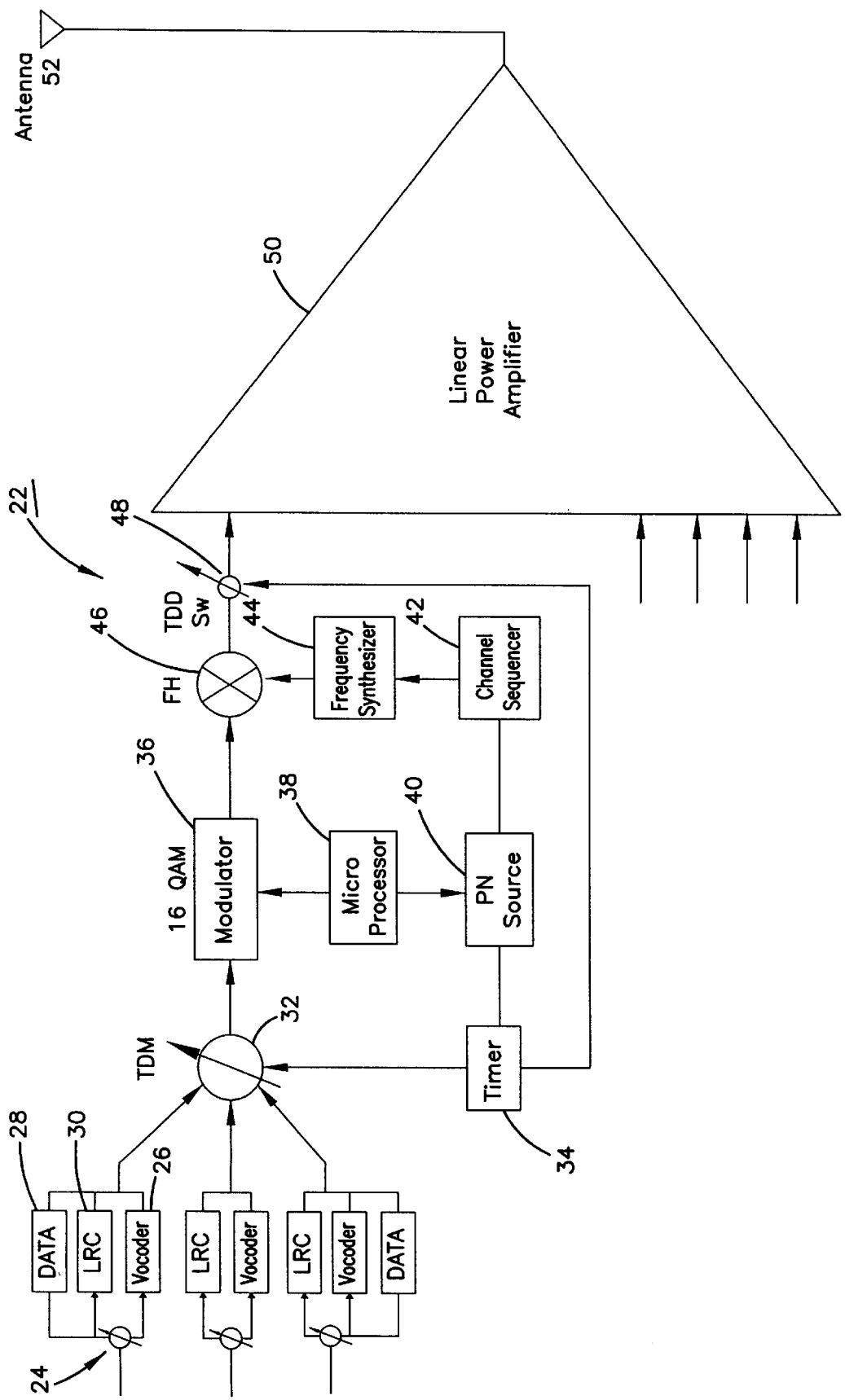
FIG. 2 illustrates the components of a transmitter at the base site according to the present invention.

FIG. 2 illustrates the components of a transmitter 22 at the base site 14 according to the present invention. A plurality of baseband channels 24 received from the control center 12 are fed into the transmitter 22. Each of the channels 24 carries either voice transmissions, data messages or mobile location requests. The voice, data and location requests are digitized and properly represented using vocoders 26, data modems 28, and location request coders 30, respectively. In one example, the vocoders 26 use vector sum linear protective coding (VSELP) with a total bit rate of 6.4 kbps (speech samples at 4.2 kbps plus coding at 2.2 kbps), although a total bit rate of 12.8 kbps could be used for increased voice quality. Such VSELP coders 26, data modems 28, and location request coders 30 are well known in the art.

A TDM multiplexor 32 combines the various channels 24 into a single multiplexed data stream based on a clock reference signal provided by a timing circuit 34. The multiplexed data stream is modulated by a modulator 36 using either a modified quadrature amplitude modulation (MQAM) technique having 16 possible states, or QPSK, or other combinations of amplitude and phase to help reduce interference. A microprocessor 38 controls both the modulator 36 and a pseudo-noise (PN) source 40. The PN code output from the PN source 40 is fed through a channel sequencer 42, a frequency synthesizer 44, and a frequency hopping mixer 46. These elements work together to provide a spread spectrum signal.

Producing spread spectrums signals normally involves a two-step modulation technique. First, the information to be transmitted is applied to a carrier by modulation and then this information bit stream is further modulated by the very fast binary bit stream of the PN code. The resulting or combination bit stream has the spread spectrum characteristics of the PN code over a wide bandwidth in the original information bit stream.

In the present invention, the spectrum is divided into sub-channel space orthogonally at 1/T separations. One or more of these sub-channels are selected by the channel sequencer 42 using the PN code output from the PN source 40 (e.g., by treating sub-portions of the PN code as binary values for selecting the desired sub-channel). The sub-frequencies within the spread bandwidth associated with each sub-channel are then synthesized by the frequency synthesizer 44. The frequency synthesizer 44 must track and choose the right sub-frequency, and then encode a correlated portion of the PN code into that sub-frequency for the predetermined hop time. Fortunately, microprocessor 38 control makes this very practical.

The data stream output by the modulator 36 is then combined with the synthesized and encoded sub-frequencies by mixer 46. An optional TDD multiplexor 48 can provide the proper time slots, wherein a group of transmit slots and a group of receive slots are alternated. In contrast, all time slots are used for transmissions when using FDD techniques. The output data stream is then fed to a linear power amplifier 50 and transmitted through an antenna 52 to the mobile units 16.

MOBILE TRANSCEIVER

Figure 3:
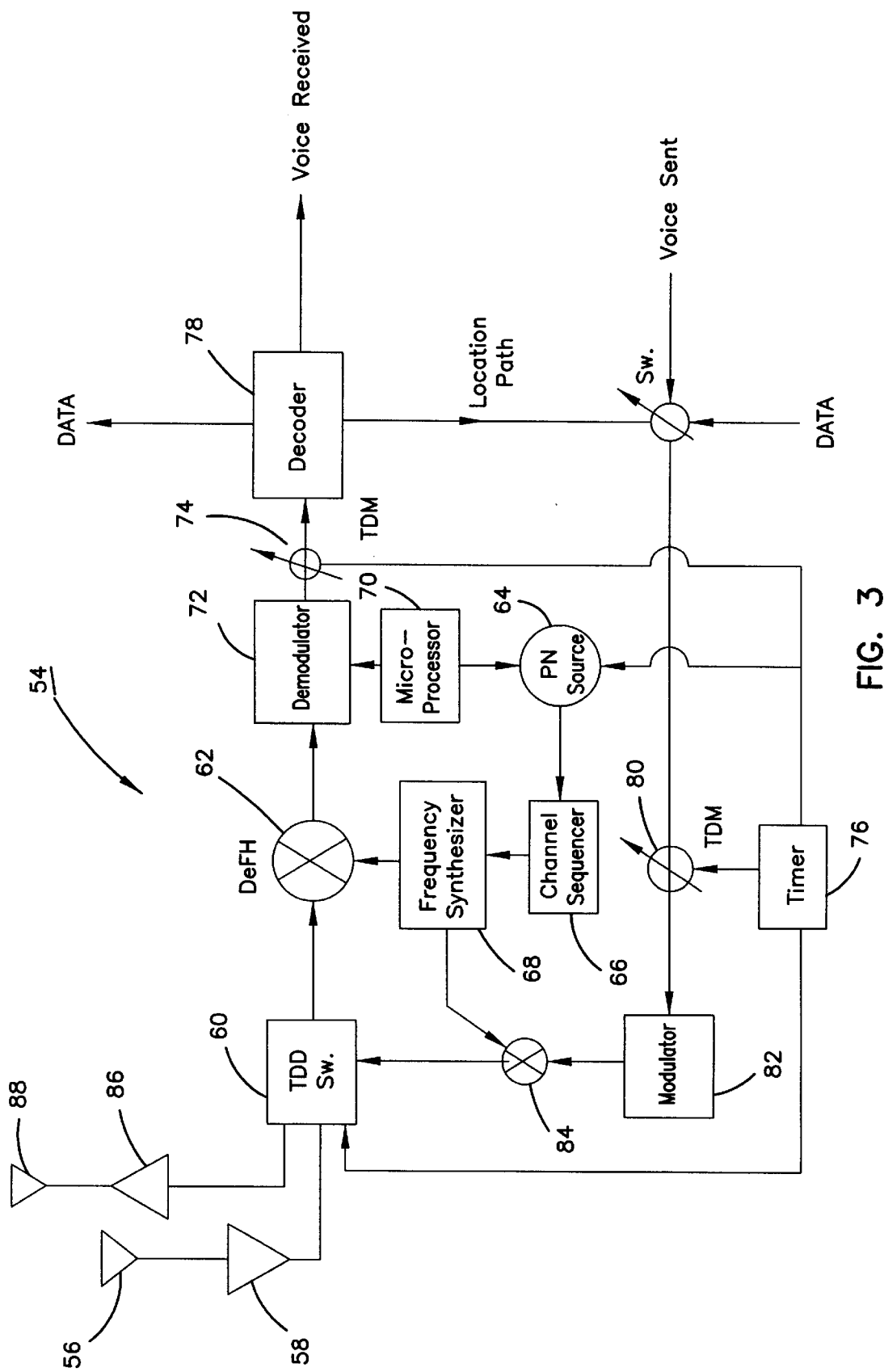
FIG. 3 illustrates the components of a transceiver located within the vehicle according to the present invention.

FIG. 3 illustrates the components of a transceiver 54 located within the MLUs 18 according to the present invention. Transmissions from the base sites 14 are received at an antenna 56. A low noise amplifier 58 amplifies the received signal and then may pass it to an optional TDD de-multiplexor 60. Of course, the TDD de-multiplexor 60 is not used if FDD is used in place of TDD.

The data stream is then reconstructed from the frequency hopping transmission at mixer 62. The output from a PN source 64 is fed to a channel sequencer 66, a frequency synthesizer 68, and the mixer 62. One or more of the sub-channels are selected by the channel sequencer 66 using the PN code output from the PN source 64. The frequency synthesizer 68 tracks and chooses the selected sub-frequency, and then encodes the correlated portion of the PN code in that sub-frequency for the predetermined hop time. The mixer 62 re-constructs the data stream by mixing the synthesized and encoded sub-frequencies with the received signal.

Since the information bit stream has been modulated by the very fast binary bit stream of the PN code, the receivers 54 responsible for capturing the data also have a copy of the same PN code as the transmitter and use it to demodulate the spread spectrum signal, thereby leaving the original information bit stream intact. In order for this system to work, the frequency synthesizer 66 must track and choose the right sub-frequency at the right time. Fortunately, a microprocessor 70 makes this very practical. Moreover, Global Positioning Satellite (GPS) receivers (not shown) can be used to synchronize the clocks used in the transmitters and receivers.

The reconstructed data stream is de-modulated by a de-modulator 72 depending on the modulation scheme used. In the preferred embodiment, the LORRAINE system uses a 16-QAM modulation scheme, although other modulation techniques could also be used. A TDM de-multiplexor 74 separates the single multiplexed data stream into the various channels based on a clock reference signal provided by a timing circuit 76. These various channels comprise digitized voice transmissions, data messages, and vehicle location requests. These channels are decoded at 78 and then output from the receiver 54 and routed to their ultimate destinations within the mobile unit 16.

A plurality of channels, comprising voice transmissions, data messages and response to vehicle location requests, may be transmitted from the mobile unit 16 to the base sites 14 as well. The voice, data and location responses are digitized and properly represented using vocoders, data modems and location response coders, respectively.

A TDM multiplexor 80 combines the various channels into a single multiplexed data stream based on a clock reference signal provided by a timing circuit 76. The multiplexed data stream is modulated by a modulator 82 depending on the modulation scheme used. The microprocessor 70 controls both the modulator 82 and the PN source 64. The output of the PN source 64 is fed through the channel sequencer 66, the frequency synthesizer 68, and a frequency hopping mixer 84 to provide a spread spectrum signal. The optional TDD multiplexor 60 can send the information in the proper slots. The output data stream is then fed to a linear power amplifier 86 and transmitted to the base sites 14 through an antenna 88.

BASE RECEIVER

Figure 4:
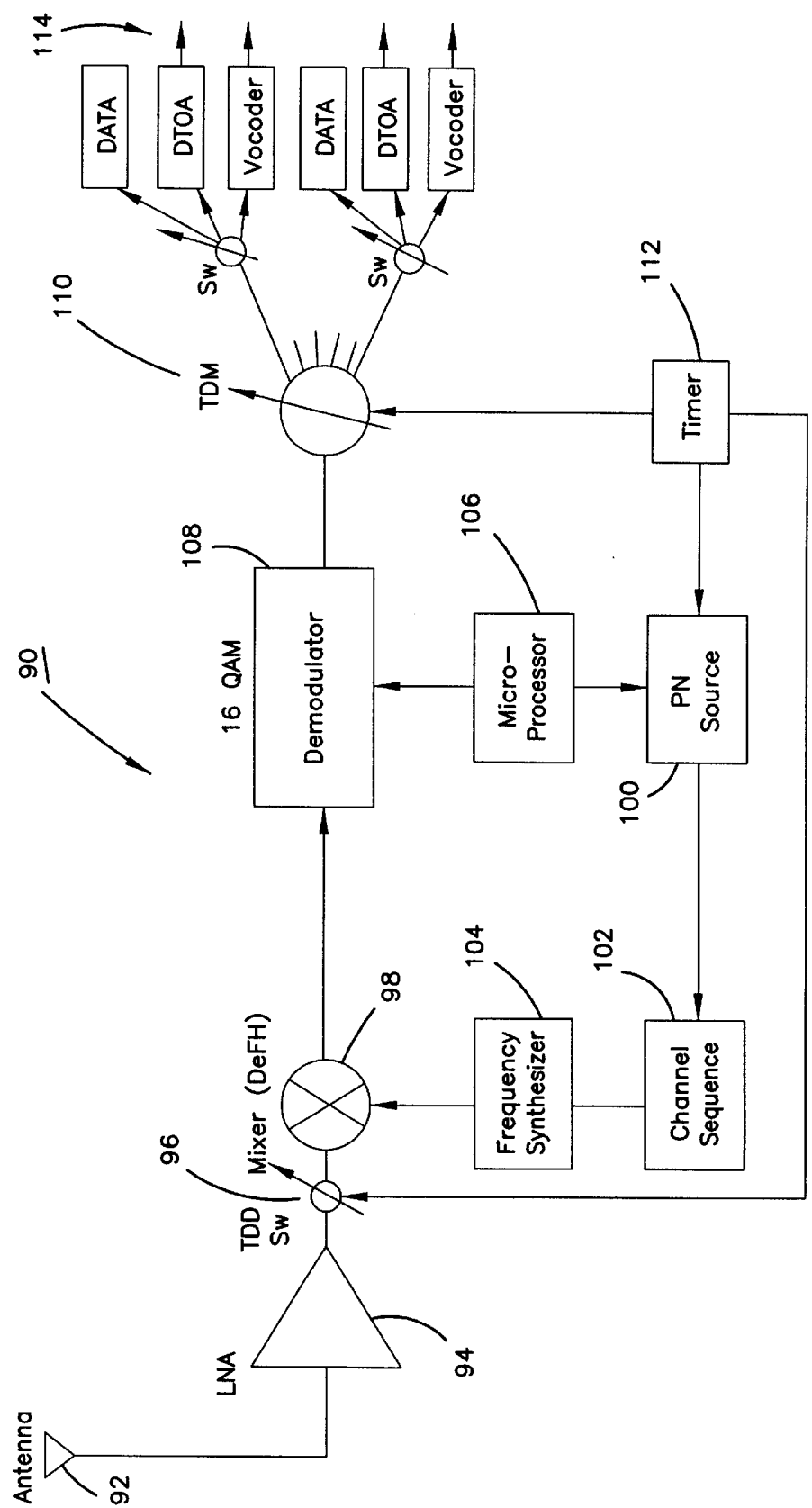
FIG. 4 illustrates the components of a receiver at the base site according to the present invention.

FIG. 4 illustrates the components of a receiver 90 at the base site 14 according to the present invention. Transmissions from the vehicles 16, such as voice, data or location information, are received at an antenna 92. A low noise amplifier 94 amplifies the received signal and then passes it to an optional TDD de-multiplexor 96.

The data stream is then reconstructed from the frequency hopping transmission at mixer 98. The output from a PN source 100 is fed to a channel sequencer 102, a frequency synthesizer 104, and the mixer 98. The PN source 100, channel sequencer 102, and frequency synthesizer 104 work together to provide a spread spectrum signal, wherein the spectrum is divided into sub-channel space orthogonally at 1/T separations. One or more of these sub-channels are selected by the channel sequencer 102 using the PN code output from the PN source 100. The sub-frequencies are then synthesized by the frequency synthesizer 104. The mixer 98 re-constructs the data stream from these selected sub-frequencies.

Since the information bit stream has been modulated by the very fast binary bit stream of the PN code, the receivers responsible for capturing the data also have a copy of the same PN code as the transmitter and use it to demodulate the spread spectrum signal, thereby leaving the original information bit stream intact. In order for this system to work, the frequency synthesizer 104 must track and choose the right sub-frequency at the right time. Fortunately, a microprocessor 106 makes this very practical. Moreover, GPS receivers (not shown) can be used to synchronize the clocks used in the transmitters and receivers.

The reconstructed data stream is de-modulated by a de-modulator 108 depending on the modulation scheme used. The de-modulator 108 is also controlled by the microprocessor 106. An optional TDM de-multiplexor 110 separates the single multiplexed data stream into the various channels based on a clock reference signal provided by a timing circuit 112. These various channels comprise digitized voice transmissions, data messages, and mobile location information. These channels 114 are then output from the receiver 90 and routed to their ultimate destinations through the control 12 center and PSTN 20.

FRAME STRUCTURES

Figure 5A:
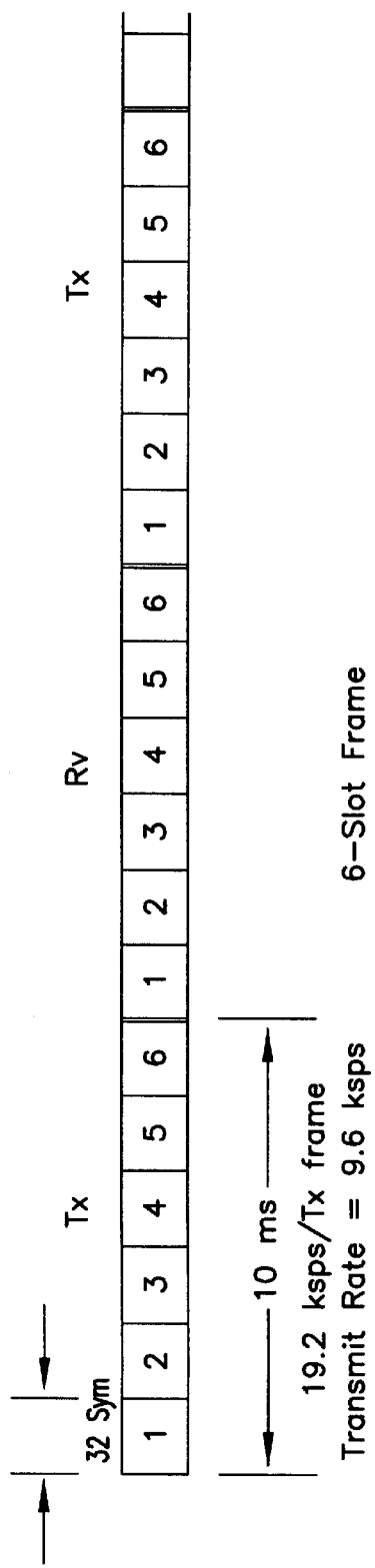
FIGS. 5A and 5B illustrates some alternative frame structures used with the present invention.
Figure 5B:
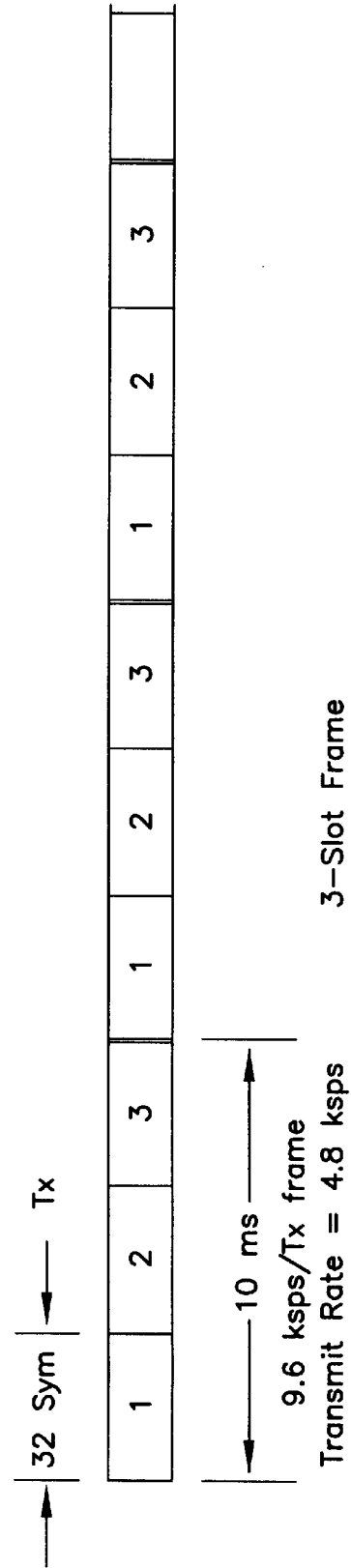

FIGS. 5A and 5B illustrates some alternative frame structures used with the present invention. The frames may comprise either 6 slots or 3 slots. For example, FIG. 5A illustrates 6 slot frames in a system using TDM/TDD, whereas FIG. 5B illustrates 3 slot frames in a system using TDM/TDD. In the TDM/TDD implementation, transmit frames (from the base site) alternate with receive frames (from the mobile units) on the same carrier. In the TDM/FDD implementation, the transmitting frames and the receiving frames are on different carriers.

OPERATING PARAMETERS

In the preferred embodiment of the present invention, the vocoders generate a total bit rate of 6.4 kbps (speech samples of 4.2 kbps+coding of 2.2 kbps). It is assumed, for the purposes of illustration, that the data messages and mobile location requests require lesser bit rates.

In a 6-slot TDM/TDD implementation, the bit rate is 38.4 kbps (6.4 kbps×6) using a 6 slot frame. Since only half of the time is spent transmitting data, the transmission bit rate is 76.8 kbps (38.4×2) in transmitting slots. By applying the 16-QAM modulation technique, the symbol rate of the present invention is 9.6 ksps (38.4÷4). The symbol rate per second for the transmit frames is 19.2 ksps (9.6×2).

In a 3-slot TDM/TDD implementation, the bit rate is 19.2 kbps (6.4 kbps×3) using a 3 slot frame, with a transmission bit rate of 38.4 kbps. The symbol rate is 4.8 ksps with a transmission symbol rate of 9.6 ksps. High quality speeches require, a speech code of 12.4 kbps is used, and the transmission symbol rate is 19.2 ksps.

For a TDM/FDD implementation, the transmission symbol rates of both 6-slot and 3-slot systems are reduced by half as compared with a TDM/TDD implementation.

The number of symbols per slot varies according to how many slots are in the frame. Each transmit frame and each receive frame is 10 ms in duration. For a 6 slot frame, with a time slot duration of 1.66 ms (10 ms/6), there are 192 symbols per frame with 32 symbols per slot. For a 3 slot frame, with a time slot duration of 3.33 ms (10 ms/3), there are 96 symbols per frame and 32 symbols per slot. If increased quality is desired, a speech coder of 12.8 kbps with a 3-slot implementation can be used and results in 64 symbols per slot.

In the preferred embodiment of the present invention, 960 slot channels are defined. A slot channel is a slot assigned to a user as a traffic channel. In the 8 MHz bandwidth of the 904–912 MHz spectrum used in the preferred embodiment, each channel is 50 kHz (per FCC regulations). There are 12 slots per 50 kHz, i.e., 6 slots for transmit and 6 slots for receiving, and therefore there are 960 slots channels (8 MHz÷50 kHz×6).

In the preferred embodiment, the frequency hopping rate matches the frame rate, although those skilled in the art will recognize that other frequency hopping rates could also be used. Since each transmit frame and each receive frame is 10 ms in duration, there are 50 frames transmitted per second (1000 ms÷20 ms). Since there are 50 frames transmitted per second, the hopping rate is 50 hops per second. When the transmit frame duration of TDD reduces to 5 ms, the hopping rate is 100. If the duration reduces to 2.5 ms, the hopping rate is 200. For FDD, if the transmit (or receive) frame duration is 5 ms, the hopping rate is 200.

SYSTEM CAPACITY

The present invention provides at least twice the capacity of standard analog cellular telephone systems. The system capacity of the present invention is measured by the number of channels per cell. For example, an analog cellular telephone system using a frequency reuse factor of K=7 is a duplex system having 25 MHz of bandwidth, i.e., 12.5 MHz is used for one way transmission. Each channel has a bandwidth of 30 kHz and thus the capacity is 59.5 channels per cell with a frequency reuse factor of 7 (12.5 MHz÷30 kHz÷7).

The present invention preferably operates within an 8 MHz bandwidth, but uses TDD to provide 50 kHz of bandwidth per channel. Moreover, each channel consists of 12 time slots, wherein 6 time slots are used for the forward link and 6 are used for the reverse link. Thus, in an 8 MHz bandwidth, the present invention has a capacity of 137 slot channels per cell with a frequency reuse factor of 7 (8 MHz÷(50 kHz÷6)÷7). Thus, in a comparison of the radio capacity of the two systems, the capacity of the present invention is 2.3 times greater than standard analog cellular telephone systems (137÷59.5). The capacity of the LOR-RAINE system varies for the other configurations operating in alternative frequency bands.

TIME OF ARRIVAL (TOA) LOCATION METHOD

In addition to the data transmission schemes discussed above, the LORRAINE system can also locate the position of the MLU 18 using multilateration techniques. When a customer wants to locate a mobile unit 16, they contact a control center 12 which initiates an MLU 18 location request via the base transceiver sites 14. The control center 12 formats and transmits a paging request to the base transceiver sites 14 for transmission to the MLU 18 in a specified time slot. The paging message is preferably formatted according to a standard protocol developed for paging systems and contains a unique identifier of the particular MLU 18. The paging request is recognized by the MLU 18, which responds with a formatted PN code as its response message, which is received at a plurality of different base transceiver sites 14. The base transceiver sites 14 each determine the time of arrival of the response message, calculate the range counts from the times of arrival, and then forward the range counts to the control center 12. The control center 12 resolves the range counts into a location based upon the range count differences received for each base transceiver site 14. To compute the location of the MLU 18, the control center 12 computes the lines of constant time differences between the pairs of base transceiver sites 14. The location of the MLU 18 is obtained by locating the crosspoint of hyperbolic curves based on the differential time of arrival for the response message at the different base transceiver sites 14.

Because of the narrow bandwidth of 50 kHz for each channel, prior art techniques cannot detect the TOA (time of arrival) of the response messages from an MLU 18 with sufficient resolution. For example, when transmitting in a 50 kHz channel, the symbol interval is 20 μs and the resolution is about 4 miles, which is clearly unacceptable. For acceptable performance, the symbol interval should be reduced to 1 μs or less for a resolution of 1000 feet or better, which typically requires a 1 MHz channel. However, the present invention uses the phase difference with the different hopping frequencies to acquire a more accurate TOA in the 50 kHz channels.

At the base transceiver site 14, the front edge of the carrier frequency $\omega_n$ is received at time $t_n+\tau$:

$$s_n = \cos[\omega_n(t_n+\tau)]$$

wherein $t_n = t_0 + (n-1)\Delta t$, $\Delta t$ is 1/50 second or 0.02 second, $n=1,50$, and $\tau$ is the time of arrival. The front edge of the data signal is received at time $t_n+\tau+\tau_0$:

$$s_n = \cos[\omega_n(t_n+\tau+\tau_0) + \theta(t_n+\tau+\tau_0)]$$

wherein $\tau_0$ is the time delay for starting transmit data at $\omega_n$ and $\theta(t_n+\tau+\tau_0)$ is the data signal arrival at time $t_n+\tau+\tau_0$. Since the data signal is within the bandwidth of 50 kHz, it can be obtained from a conventional phase lock loop circuit. From the received carrier frequency within one second (50 hops):

$$s_1 = \cos(\omega_1 t_0 + \omega_1 \tau) \quad (1)$$

wherein:

$$\omega_1 t_0 + \omega_1 \tau = 2\pi k_1 - \psi_1$$

and:

$$s_2 = \cos[\omega_2(t_0+\Delta t) + \omega_2 \tau] \quad (2)$$

wherein:

$$\omega_2(t_0+\Delta t) + \omega_2 \tau = 2\pi k_2 - \psi_2$$

and:

$$s_3 = \cos[\omega_3(t_0+2\Delta t) + \omega_3 \tau] \quad (3)$$

wherein:

$$\omega_3(t_0+2\Delta t) + \omega_3 \tau = 2\pi k_3 - \psi_3$$

and:

$$S_4 = \cos[\omega_4(t_0+3\Delta t) + \omega_4 \tau] \quad (4)$$

wherein:

$$\omega_4(t_0 + 3\Delta t) + \omega_4 \tau = 2\pi k_4 - \psi_4 \quad (50)$$

* * ***

$$s_{50} = \cos[\omega_{50}(t_0 + 49\Delta t) + \omega_{50}\tau]$$

wherein:

$$\omega_{50}(t_0+49\Delta t) + \omega_{50}\tau = 2\pi k_{50} - \psi_{50}$$

Among equations (1) through (50) above, the known parameters are $\omega_i$, $\Delta t$ and $\psi_i$, wherein $\psi_i$ is the phase measured in radians from the carrier signal $\omega_i$. However, the $\psi_i$ has an ambiguity of $2\pi k_i$. The unknown parameters are $t_0$, $\tau$=TOA, and a constant $k_i$. Therefore: equation (1) above has 3 unknowns; combined equations (1) and (2) above have 4 unknowns; combined equations (1), (2) and (3) above have 5 unknowns; and combined equations (1) through (50) have 52 unknowns. Combined equations (1) through (50) have an uncertainty range for determining the value $\tau$, because fifty equations are used to solve 52 unknowns. Fortunately, when two adjacent channels hop in one second, at the $i^{th}$ hop:

$$s_i = \cos[\omega_i(t_0+(i-1)\Delta t) + \omega_i \tau]$$

wherein:

$$\omega_i(t_0+(i-1)\Delta t)+\omega_i\tau=2\pi k_i+\psi_i$$

and at the $j^{th}$ hop:

$$s_j=\cos[\omega_j(t_0+(j-1)\Delta t)+\omega_j\tau]$$

wherein:

$$\omega_j(t_0+(j-1)\Delta t)+\omega_j\tau=2\pi k_j+\psi_j$$

If $\omega_j=\omega_i+\Delta\omega$, then:

$$s_j=\cos[(\omega_i+\Delta\omega)[t_0+(j-1)\Delta t]+(\omega_i+\Delta\omega)\tau]$$

and:

$$s_j = \cos[\omega_i(t_0 + (i-1)\Delta t) + \omega_i\tau + \Delta\omega[t_0 + (j-1)\Delta t] + \omega_i(j-i)\Delta t + \Delta\omega\tau]$$

and:

$$2\pi k_j + \psi_j = 2\pi k_i + \psi_i + \Delta\omega[t_0 + (j-i)\Delta t] + \omega_i(j-i)\Delta t + \Delta\omega\tau$$

$$2\pi k_j+\psi_j=2\pi k_i+\Delta\omega[(j-1)\Delta t+\omega_i(j-i)\Delta t+\Delta\omega(t_0+\tau)+\psi_i$$

or;

$$2\pi k_j+\psi_j=[2\pi k_i+\Delta\omega[(j-1)\Delta t]+\omega_i(j-i)\Delta t+\Delta\omega t_0]+\Delta\omega\tau+\psi_i$$

If $\Delta\omega\tau \leq 2\pi$, $\tau \leq 20$ μs (4 miles or less), then:

$$2\pi k_j=2\pi k_i+\Delta\omega[(j-1)\Delta t]+\omega_i(j-i)\Delta t+\Delta\omega t_0 \quad (A)$$

for $(\psi_j>\psi_i)$, and:

$$2\pi k_j=2\pi(k_i+1)+\Delta\omega[(j-1)\Delta t]+\omega_i(j-i)\Delta t+\Delta\omega t_0 \quad (B)$$

for $(\psi_j<\psi_i)$.

For $\Delta\omega\tau$ in the range $2\pi \leq \Delta\omega\tau \leq 4\pi$ 20 μs$\leq \tau \leq 40$ μs (between 4 miles and 8 miles), then:

$$2\pi k_j=2\pi(k_i+1)+\Delta\omega[(j-1)\Delta t]+\omega_i(j-i)\Delta t+\Delta\omega t_0 \quad (C)$$

for $(\psi_j>\psi_k)$ and:

$$2\pi k_j=2\pi(k_i+2)+\Delta\omega[(j-1)\Delta t]+\omega_i(j-i)\Delta t+\Delta\omega t_0 \quad (D)$$

for $(\psi_j<\psi_k)$.

In this method, as long as there are two pairs of hopping frequencies that meet the conditions of $\omega_j=\omega_i+\Delta\omega$, then two $k_j$'s with two $k_i$'s can be eliminated. Then, 50 equations will solve 50 unknowns.

Figure 6:
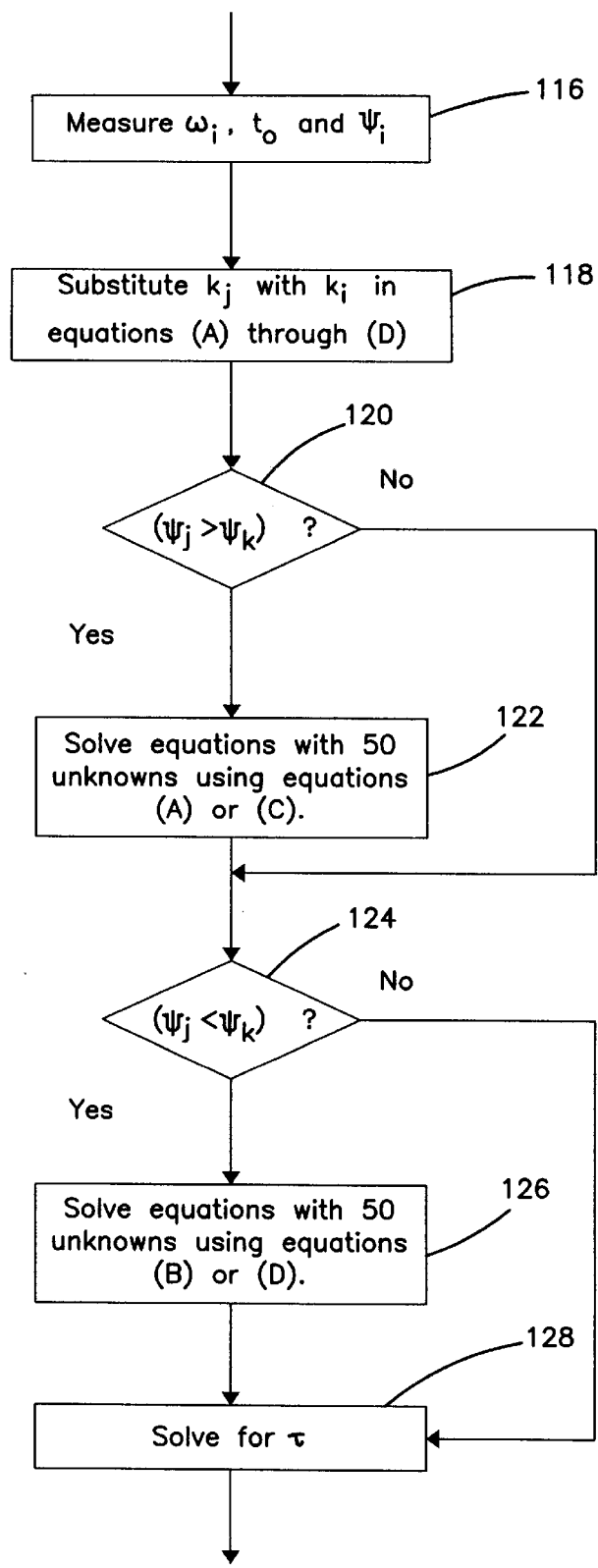
FIG. 6 is a flow chart illustrating the steps of the time of arrival location method used in the present invention.

FIG. 6 is a flow chart illustrating the steps used in the time of arrival location method used in the present invention. Block 116 represents the measurement of $\omega_i$, $t_0$ and $\psi_i$ for each of the frequency hops. Block 118 represents the substitution of $k_j$ with $k_i$ in equations (A) through (D) above. Block 120 is a decision block that determines whether $(\psi_j>\psi_k)$. If so, control transfers to block 122; otherwise control transfers to block 124. Block 122 represents solving for the unknowns using equations (A) or (C) above. Block 124 is a decision block that determines whether $(\psi_j<\psi_k)$. If so, control transfers to block 126; otherwise control transfers to block 128. Block 126 represents solving for the unknowns using equations (B) or (D). Block 128 represents solving for τ and then using this information for resolution into a location.

CONCLUSION

This concludes the description of the preferred embodiment of the invention. The following paragraphs describe some alternative methods of accomplishing the same objects.

An alternative embodiment could use another time of arrival location method with the present invention. The method would transmit a high speed PN code at 1 mbps from the vehicle to the base site receiver in a given time slot. Thus, 20 different frequency channels could stop transmitting frames in the given time slot, so that the 20 time slots could be used to transmit the PN code to the base site receivers. Those skilled in the art will recognize that other similar methods could be used as well.

In summary, the present application discloses an integrated radio frequency communication system that provides integrated voice, data and location services. The radio frequency communications system combines time division multiplexing (TDM) techniques with optional time division duplexing (TDD) techniques to provide a plurality of time slot channels for these services. Spread spectrum techniques help reduce noise and interference in the system.

The present invention has several advantages. One of the advantages is that it provides location information to the subscriber at the mobile unit, as well as data and voice services. Another advantage is that the system provides more efficient utilization of the 8 MHz bandwidth allocated to the system, so that it provides 2.3 times the capacity of normal analog cellular telephone systems. Still another advantage is that the frequency hopping rate is slow and therefore there is little risk to its use, and the use of frequency hopping increases the quality of transmissions on poor channels.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of radio frequency (RF) communications providing integrated location, voice, data, facsimile and other services, comprising the steps of:
    (a) modulating a multiplexed data stream;
    (b) dividing a transmission channel into a plurality of sub-channels;
    (c) sequentially selecting the sub-channels using a correlated portion of a pseudo-noise (PN) code;
    (d) synthesizing sub-frequencies associated with each selected sub-channel;
    (e) encoding the correlated portion of the PN code into the synthesized sub-frequencies associated with each selected sub-channel; and
    (f) combining the modulated, multiplexed data stream with the synthesized and encoded sub-frequencies to create a transmission signal.

2. The invention as set forth in claim 1, further comprising the step of time division duplexing the transmission signal.

3. The invention as set forth in claim 1, further comprising the step of frequency division duplexing the transmission signal.

4. The invention as set forth in claim 1 above, fuirther comprising the step of digitizing the voice transmissions using vocoders.

5. The invention as set forth in claim 1 above, further comprising the step of digitizing the data messages using analog-to-digital converters.

6. The invention as set forth in claim 1 above, further comprising the step of digitizing the mobile unit location requests.

7. The invention as set forth in claim 1 above, wherein the modulating step comprises the step of modulating the multiplexed data stream using a modified quadrature amplitude modulation (MQAM) technique having a plurality of possible combinations of amplitude and phase.

8. The invention set forth in claim 1, further comprising the step of combining a plurality of voice transmissions, data messages, and vehicle location requests to produce the multiplexed data stream.

9. A method of radio frequency (RF) communications providing integrated location, voice, data, facsimile and other services, comprising the steps of:
(a) receiving a spread spectrum transmission signal on a reception channel;
(b) dividing the reception channel into a plurality of sub-channels, selecting one or more of the sub-channels using a correlated portion of a pseudo-noise (PN) code, synthesizing sub-frequencies associated with each selected sub-channel, and encoding the correlated portion of the PN code into the synthesized sub-frequencies associated with each selected sub-channel; and
(c) combining the received signal with the synthesized and encoded sub-frequencies to re-create a transmitted data stream, and de-modulating the data stream.

10. The invention as set forth in claim 9, further comprising the step of time division duplexing the transmission signal.

11. The invention as set forth in claim 9, further comprising the step of frequency division duplexing the transmission signal.

12. The invention as set forth in claim 9 above, further comprising the step of digitizing the voice transmissions using vocoders.

13. The invention as set forth in claim 9 above, further comprising the step of digitizing the data messages using analog-to-digital converters.

14. The invention as set forth in claim 9 above, further comprising the step of digitizing the vehicle location requests.

15. The invention as set forth in claim 9 above, wherein the modulating step comprises the step of modulating the multiplexed data stream using a modified quadrature amplitude modulation (MQAM) technique having a plurality of possible combinations of amplitude and phase.

16. The method of claim 9, wherein the receiving step further comprises the steps of:
(1) receiving a spread spectrum transmission signal from a mobile unit at a plurality of receivers, wherein the spread spectrum transmission signal comprises a plurality of channels, each of the channels comprises a frequency hop, and one of the channels comprises a response to a location request;
(2) calculating a time of arrival ($\tau$) of the response at each of the receivers by measuring $\omega_i$ (a frequency for a carrier signal), $t_o$ (an arrival time for the carrier signal) and $\psi_i$ (a phase angle in radians of the carrier signal) for each frequency hop made in a specified time period, and solving for $\tau$ in:

$$s_i = \cos[\omega_i(t_0+(i-1)\Delta t)+\omega_i\tau]$$

wherein:

$$\omega_i(t_0+(i-1)\Delta t)+\omega_i\tau = 2\pi k_i + \psi_i$$

and i represents every sub-frequency; and
(3) computing lines of constant time differences in the time of arrival between pairs of the receivers, and locating a crosspoint of hyperbolic curves based on the constant time differences to obtain the location of the mobile unit.

* * * * *